United States Patent
Satou et al.

(10) Patent No.: US 9,035,732 B2
(45) Date of Patent: May 19, 2015

(54) LINEAR ACTUATOR AND GROOVE FASHIONING METHOD FOR LINEAR ACTUATOR

(71) Applicant: Kayaba Industry Co., Ltd., Tokyo (JP)

(72) Inventors: Kousuke Satou, Kanagawa (JP); Takashi Kakiuchi, Kanagawa (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/373,813

(22) PCT Filed: Jun. 5, 2013

(86) PCT No.: PCT/JP2013/065621
§ 371 (c)(1),
(2) Date: Jul. 22, 2014

(87) PCT Pub. No.: WO2013/191000
PCT Pub. Date: Dec. 27, 2013

(65) Prior Publication Data
US 2015/0015352 A1      Jan. 15, 2015

(30) Foreign Application Priority Data

Jun. 19, 2012   (JP) ................................. 2012-137973

(51) Int. Cl.
*H01F 7/00* (2006.01)
*H01F 7/16* (2006.01)
*H02K 41/03* (2006.01)

(52) U.S. Cl.
CPC ............ *H01F 7/1615* (2013.01); *H02K 41/031* (2013.01); *B60G 2202/422* (2013.01); *B60G 2202/44* (2013.01); *B60G 2600/24* (2013.01); *H02K 2205/12* (2013.01); *Y10T 82/10* (2015.01)

(58) Field of Classification Search
CPC ....................................................... H02K 41/02
USPC ........................................................... 335/229
See application file for complete search history.

(56) References Cited

U.S. PATENT DOCUMENTS

| | | | | |
|---|---|---|---|---|
| 4,600,215 A | * | 7/1986 | Kuroki et al. | 280/5.519 |
| 4,726,453 A | * | 2/1988 | Obstfelder et al. | 188/266.4 |
| 4,776,437 A | * | 10/1988 | Ishibashi et al. | 188/266.4 |
| 5,263,558 A | * | 11/1993 | Yamaoka | 188/267 |

(Continued)

FOREIGN PATENT DOCUMENTS

| | | |
|---|---|---|
| JP | 63-129847 A | 6/1988 |
| JP | 2003-324934 A | 11/2003 |

(Continued)

*Primary Examiner* — Alexander Talpalatski
(74) *Attorney, Agent, or Firm* — Rabin & Berdo, P.C.

(57) ABSTRACT

A linear actuator includes a first tube, a second tube inserted into the first tube to be free to slide, a rod fixed at one end of the rod to the first tube, a rod guide provided on the other end of the rod so as to slide relative to the second tube, a plurality of permanent magnets held by the rod, a holder that is fitted into the second tube and holds a plurality of coils, a first chamber defined between one end of the holder and an end portion of the first tube, and a second chamber defined between the other end of the holder and the rod guide. An insertion hole which connects the first chamber to the second chamber and through which the rod passes is formed in the holder. A connecting groove that connects the first chamber to the second chamber is formed in the second tube to extend in an axial direction.

5 Claims, 3 Drawing Sheets

(56) References Cited

U.S. PATENT DOCUMENTS

| | | | | |
|---|---|---|---|---|
| 5,745,019 A | * | 4/1998 | Renger | 335/222 |
| 6,354,607 B1 | * | 3/2002 | Kawashima et al. | 280/5.511 |
| 6,952,060 B2 | * | 10/2005 | Goldner et al. | 310/12.13 |
| 8,253,281 B2 | * | 8/2012 | Namuduri et al. | 310/23 |
| 8,941,251 B2 | * | 1/2015 | Zuo et al. | 290/1 R |
| 2003/0164647 A1 | * | 9/2003 | Kobayashi et al. | 310/12 |
| 2008/0079522 A1 | * | 4/2008 | Okada et al. | 335/229 |

FOREIGN PATENT DOCUMENTS

| | | |
|---|---|---|
| JP | 2004-357464 A | 12/2004 |
| JP | 2012-065452 A | 3/2012 |

\* cited by examiner

US 9,035,732 B2

LINEAR ACTUATOR AND GROOVE FASHIONING METHOD FOR LINEAR ACTUATOR

TECHNICAL FIELD

The present invention relates to a linear actuator that expands and contracts in an axial direction, and a method of fashioning a groove in the linear actuator.

BACKGROUND ART

JP2004-357464A discloses a linear actuator in which a first tube and a second tube undergo relative displacement in an axial direction on the basis of electromagnetic force generated between permanent magnets provided on the first tube and coils provided on the second tube.

SUMMARY OF INVENTION

The linear actuator described in JP2004-357464A is configured such that a space defined on an end portion side of the first tube and a space defined on an end portion side of the second tube communicate with each other only through an extremely small gap between the permanent magnets and the coils arranged in the axial direction. Therefore, air resistance in the gap during expansion and contraction of the linear actuator is comparatively large, and as a result, smooth expansion and contraction operations of the linear actuator are impaired.

An object of the present invention is to provide a linear actuator and a method of fashioning a groove in the linear actuator, with which air resistance during expansion and contraction can be reduced.

An aspect of the present invention provides a linear actuator that expands and contracts in an axial direction, including a first tube, a second tube inserted into the first tube to be free to slide, a rod fixed at one end of the rod to an end portion of the first tube, a rod guide provided on the other end of the rod so as to slide relative to the second tube, a plurality of permanent magnets held by the rod so as to be arranged in the axial direction, a holder that is fitted into the second tube and holds a plurality of coils that oppose the permanent magnets, a first chamber defined between one end of the holder and the end portion of the first tube, and a second chamber defined between the other end of the holder and the rod guide. An insertion hole which connects the first chamber to the second chamber and through which the rod passes is formed in the holder. A connecting groove that connects the first chamber to the second chamber is formed in the second tube to extend in the axial direction.

Embodiments and advantages of the present invention will be described in detail below with reference to the attached drawings.

DESCRIPTION OF EMBODIMENTS

Figure 1:
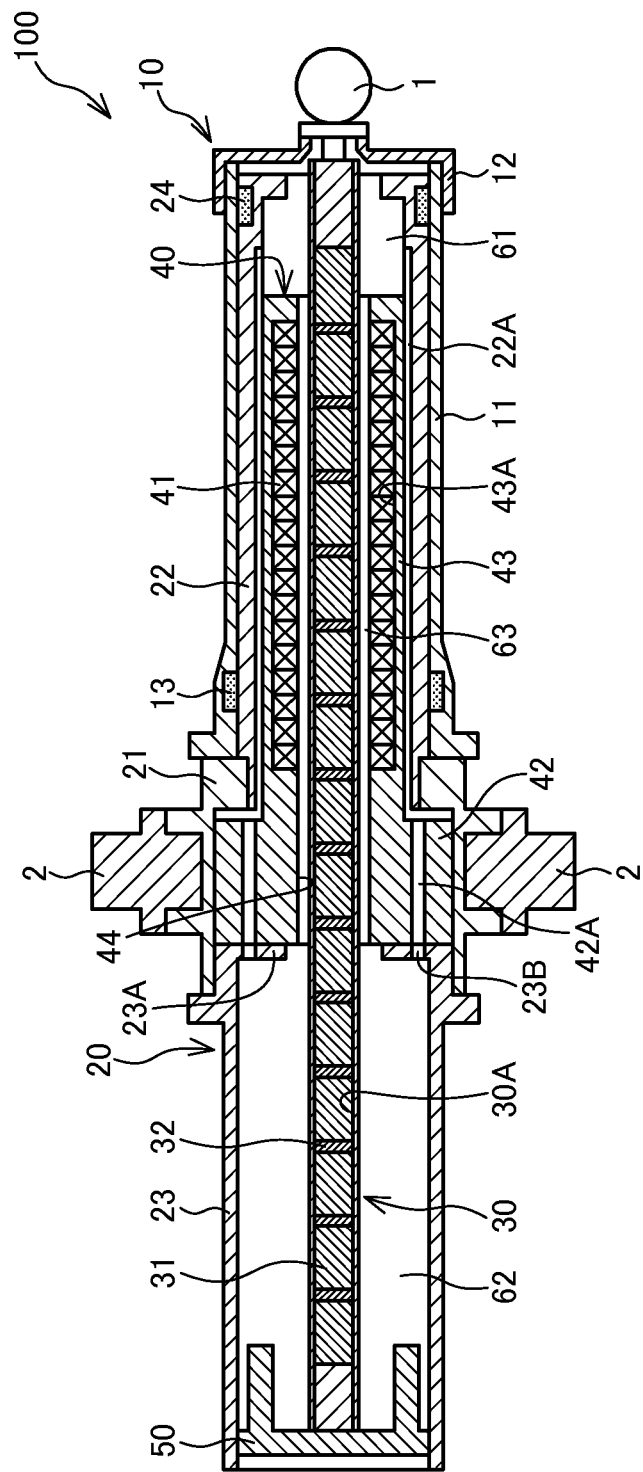
FIG. 1 is an axial direction sectional view showing a linear actuator according to an embodiment in a maximum contraction condition.
Figure 2:
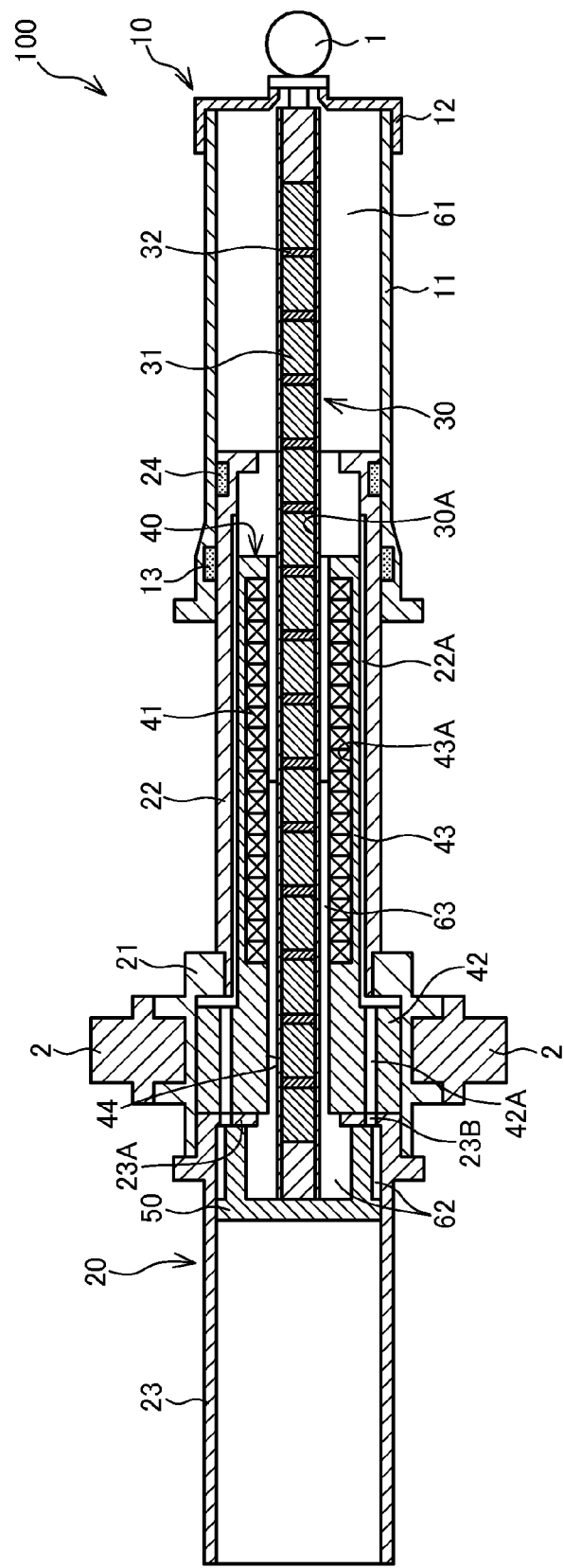
FIG. 2 is an axial direction sectional view showing the linear actuator according to this embodiment in a maximum expansion condition.

Referring to FIGS. 1 and 2, a linear actuator 100 according to an embodiment will be described.

The linear actuator 100 is used as a vibration damping actuator that suppresses vibration of an automobile, a railway vehicle, an architectural structure, or the like.

The linear actuator 100 includes a first tube 10, a second tube 20 inserted into the first tube 10 to be free to slide, a rod 30 that is fixed to an end portion of the first tube 10 and holds permanent magnets 31, and a coil holder 40 that is provided so as to be fitted into the second tube 20, and holds coils 41 that oppose the permanent magnets 31. The linear actuator 100 is disposed between two members that move relative to each other via a connecting portion 1 provided on the first tube 10 and a connecting shaft 2 provided on the second tube 20.

In the linear actuator 100, a thrust (an electromagnetic force) for driving the rod 30 in an axial direction is generated in accordance with a current flowing through the coils 41, and on the basis of this thrust, the first tube 10 and the second tube 20 are relatively displaced. As a result, the linear actuator 100 expands and contracts between a maximum contraction position shown in FIG. 1 and a maximum expansion position shown in FIG. 2.

The first tube 10 includes a cylindrical outer tube 11 open at both ends, and a cap 12 attached to one end of the outer tube 11. One end of the first tube 10 is closed by the cap 12, and the other end of the first tube 10 is formed as an open end. The connecting portion 1 is fixed to an outside surface of the cap 12.

The second tube 20 includes a cylindrical base portion 21, an inner tube 22 fixed to one end side of the base portion 21, and a guide tube 23 fixed to the other end side of the base portion 21.

The base portion 21 is a tubular member open at both ends. A pair of the connecting shafts 2 are fixed to an outer periphery of the base portion 21 so as to project in a radial direction. The connecting shafts 2 are provided in positions deviating from each other by 180° in a circumferential direction. The second tube 20 is connected to one of the two relatively moving members via the connecting shafts 2, and the first tube 10 is connected to the other of the two relatively moving members via the connecting portion 1.

The inner tube 22 is a tubular member open at both ends. The inner tube 22 is disposed on the base portion 21 and inserted in this condition into the outer tube 11 of the first tube 10. An annular bearing 24 that slides against the inner periphery of the outer tube 11 is provided on an outer periphery of a free end of the inner tube 22. An annular bearing 13 that slides against the outer periphery of the inner tube 22 is provided on an inner periphery of the open end of the outer tube 11 on an inner tube 22 insertion side. The outer tube 11 of the first tube 10 and the inner tube 22 of the second tube 20 slide smoothly via the bearings 13, 24.

The guide tube 23 is a tubular member open at both ends. A rod guide 50 fixed to a tip end of the rod 30 is provided in the guide tube 23 to be free to slide.

The rod 30 is a rod-shaped member having a hollow portion 30A. One end of the rod 30 is fixed to the cap 12 constituting the end portion of the first tube 10. The aforementioned rod guide 50 is fixed to the other end of the rod 30. By providing the rod guide 50 on the tip end of the rod 30, a tip end part of the rod 30 can be prevented from swinging in the radial direction during expansion and contraction of the linear actuator 100.

A plurality of the permanent magnets 31 are held in the hollow portion 30A of the rod 30 so as to be arranged in the axial direction. The permanent magnet 31 is formed in a columnar shape and polarized such that an N pole and an S pole appear in the axial direction. Adjacent permanent magnets 31 are disposed such that identical poles oppose each other. Further, yokes 32 are provided between the adjacent permanent magnets 31. It should be noted that the yokes 32 do not necessarily have to be provided, and the respective permanent magnets 31 may be disposed directly adjacent to each other.

The coil holder 40 is a tubular member provided to be fitted to the respective inner peripheries of the base portion 21 and the inner tube 22 of the second tube 20. An inner diameter of the base portion 21 is formed to be larger than an inner diameter of the inner tube 22, and therefore the coil holder 40 includes a large diameter portion 42 fitted to the inner periphery of the base portion 21 and a small diameter portion 43 fitted to the inner periphery of the inner tube 22.

Further, the coil holder 40 includes an insertion hole 44 through which the rod 30 is passed in the axial direction. An annular recessed portion 43A is formed in an inner peripheral surface of the small diameter portion 43 constituting the insertion hole 44, and a plurality of the coils 41 are fixed to the annular recessed portion 43A. The plurality of coils 41 are arranged in the axial direction so as to oppose the permanent magnets 31.

A current conducted through the coils 41 is controlled by a controller disposed on the exterior of the linear actuator 100 or the like. The controller controls a magnitude and a direction of the current conducted through the coils 41 on the basis of information indicating relative positions of the coils 41 and the permanent magnets 31, which is detected by a position sensor not shown in the figures. As a result, the thrust generated by the linear actuator 100 and a thrust generation direction (an expansion/contraction direction) are adjusted.

The position sensor is a Hall element that generates a Hall voltage corresponding to a strength of a magnetic field, and is buried in the large diameter portion 42 of the coil holder 40.

In the linear actuator 100, when a current is conducted through the coils 41 in a predetermined direction, a thrust for driving the rod 30 in a rightward direction of FIG. 1 is generated. When the rod 30 is driven in the rightward direction, the outer tube 11 of the first tube 10 moves in the rightward direction while sliding relative to the inner tube 22 of the second tube 20, and as a result, the linear actuator 100 expands.

A projecting portion 23A that projects inwardly is formed on the fixed end of the guide tube 23, and when the linear actuator 100 expands to the maximum expansion position (see FIG. 2), the rod guide 50 impinges on a left side surface of the projecting portion 23A such that further movement of the rod 30 is restricted. The rod guide 50 thereby functions as a stopper.

When a current is conducted through the coils 41 in an opposite direction to that of the expansion operation, on the other hand, a thrust for driving the rod 30 in a leftward direction of FIG. 2 is generated. When the rod 30 is driven in the leftward direction, the outer tube 11 of the first tube 10 moves in the leftward direction while sliding relative to the inner tube 22 of the second tube 20, and as a result, the linear actuator 100 contracts.

When the linear actuator 100 contracts to the maximum contraction position (see FIG. 1), the open end of the outer tube 11 impinges on a right end portion of the base portion 21 such that further movement of the rod 30 is restricted. The open end of the outer tube 11 thereby functions as a stopper.

In the linear actuator 100 configured as described above, as shown in FIG. 1, a first chamber 61 is defined as a space between one end of the coil holder 40 and the cap 12 of the first tube 10, and a second chamber 62 is defined as a space between the other end of the coil holder 40 and the rod guide 50 disposed in the guide tube 23.

The first chamber 61 and the second chamber 62 communicate via the insertion hole 44 in the coil holder 40. In other words, the first chamber 61 and the second chamber 62 communicate through an annular gap 63 formed between an inner periphery of the coil holder 40 constituting the insertion hole 44 and an outer periphery of the rod 30.

Figure 3:
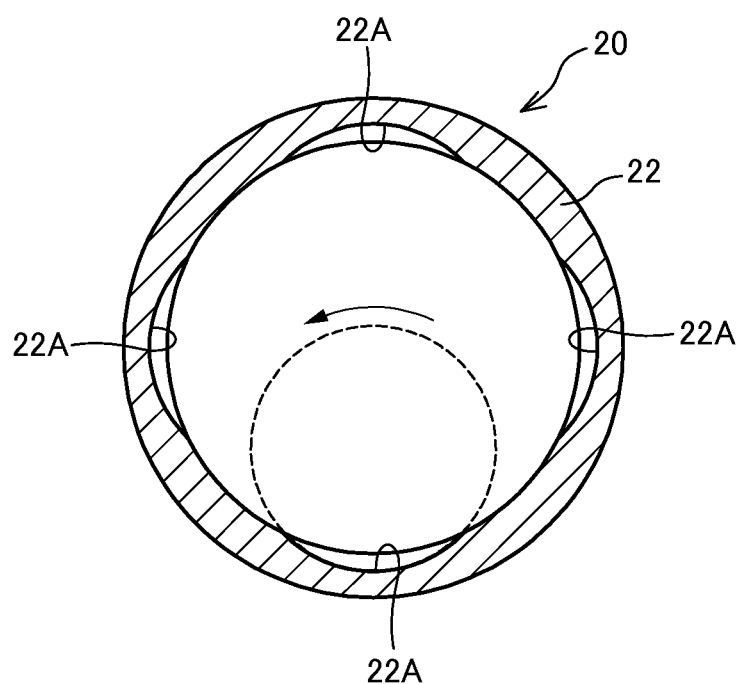
FIG. 3 is a radial direction sectional view of an inner tube constituting a second tube of the linear actuator.

Further, as shown in FIGS. 1 and 3, a connecting groove 22A that connects the first chamber 61 and the second chamber 62 is formed as a recess in an inner peripheral surface of the inner tube 22 constituting the second tube 20. Four connecting grooves 22A are formed at equal intervals in the circumferential direction so as to extend in the axial direction. The connecting groove 22A is formed such that a radial direction cross-section thereof is arc-shaped.

The connecting groove 22A is formed in an arc shape, as shown in FIG. 3, by setting the inner tube 22 on a lathe so that a turning tool can be inserted into the inner tube 22 (attachment process), and then rotating the turning tool so as to trim the inner peripheral surface of the inner tube 22 (trimming process). A dotted line in FIG. 3 shows a trajectory of a cutting edge of the turning tool. It is comparatively difficult to fashion a groove or the like having a rectangular cross-section in an inner peripheral surface of a cylindrical member such as the inner tube 22, but the connecting groove 22A has an arc-shaped sectional shape and can therefore be fashioned easily by trimming, as described above.

As shown in FIG. 1, the connecting groove 22A extends from a position facing the first chamber 61 to an end portion of the inner tube 22. At the end portion of the inner tube 22, the connecting groove 22A communicates with the second chamber 62 via through holes 42A, 23B respectively penetrating the large diameter portion 42 of the coil holder 40 and the projecting portion 23A of the guide tube 23 in the axial direction. The through holes 42A, 23B are provided to correspond to formation positions of the connecting grooves 22A.

When the linear actuator 100 expands, a capacity of the first chamber 61 increases and a capacity of the second chamber 62 decreases, and therefore air in the second chamber 62 moves into the first chamber 61 through the annular gap 63, the through holes 42A, 23B, and the connecting grooves 22A.

When the linear actuator 100 contracts, on the other hand, the capacity of the first chamber 61 decreases and the capacity of the second chamber 62 increases, and therefore air in the first chamber 61 moves into the second chamber 62 through the annular gap 63, the connecting grooves 22A, and the through holes 42A, 23B.

It should be noted that in the linear actuator 100, the large diameter portion 42 of the coil holder 40 may be omitted such that the first chamber 61 and the second chamber 62 are connected by the connecting grooves 22A in the inner tube 22 alone. In this case, there is no need to form the through hole 23B in the projecting portion 23A of the guide tube 23.

Further, in the linear actuator 100, the projecting portion 23A of the guide tube 23 may be omitted such that during maximum expansion, the rod guide 50 impinges on a left end surface of the large diameter portion 42 of the coil holder 40. In this case, the first chamber 61 and the second chamber 62 communicate with each other through the connecting grooves 22A in the inner tube 22 and the through hole 42A in the large diameter portion 42.

With the linear actuator 100 according to the embodiment described above, following effects can be obtained.

In the linear actuator 100, the first chamber 61 and the second chamber 62 are connected by the insertion hole 44 in the coil holder 40, through which the rod 30 is passed, and the connecting grooves 22A formed in the inner tube 22, and therefore the air in the first chamber 61 and the second chamber 62 can move between the chambers easily. Hence, air resistance during expansion and contraction of the linear actuator 100 can be reduced, and as a result, the expansion and contraction operations of the linear actuator 100 are performed smoothly.

Further, in the linear actuator 100, the connecting groove 22A in the inner tube 22 is formed to have an arc-shaped radial direction cross-section. By forming the connecting groove 22A with an arc-shaped cross-section in this manner, the connecting groove 22A can be fashioned in the inner tube 22 easily, enabling a reduction in a number of steps and so on required during groove fashioning.

Furthermore, in the linear actuator 100, the coil holder 40 includes the small diameter portion 43 fitted to the inner tube 22 and the large diameter portion 42 fitted to the base portion 21, and the connecting grooves 22A in the inner tube 22 are configured to connect the first chamber 61 and the second chamber 62 via the through hole 42A in the large diameter portion 42. By connecting the first chamber 61 and the second chamber 62 via the insertion hole 44 in the coil holder 40, the connecting grooves 22A, and the through hole 42A in this manner, air resistance during expansion and contraction of the linear actuator 100 can be reduced. Moreover, the position sensor or the like that detects the relative positions of the coils 41 and the permanent magnets 31 can be disposed in the large diameter portion 42 of the coil holder 40.

An embodiment of the present invention was described above, but the above embodiment merely illustrates a part of examples of applications of the present invention, and the technical scope of the present invention is not limited to the specific configurations described in the embodiment.

In the linear actuator 100 according to this embodiment, the plurality of permanent magnets 31 are fixed within the hollow portion 30A of the rod 30 so as to be arranged in the axial direction, but a fixing position of the permanent magnets 31 is not limited thereto. For example, the plurality of permanent magnets 31 may be formed in a ring shape and fitted externally to the outer periphery of the rod 30 so as to be arranged fixedly in the axial direction. In this case, the annular gap 63 connecting the first chamber 61 and the second chamber 62 is formed between the insertion hole 44 in the coil holder 40 and an outer periphery of the permanent magnets 31.

Further, in the linear actuator 100, a through hole for connecting the second chamber 62 to the outside may be formed in the guide rod 50, and a through hole for connecting the first chamber 61 to the outside may be formed in the cap 12. A filter made of mesh or the like is preferably provided in each of the through holes to prevent infiltration of dirt, dust, and so on.

The present application claims priority based on Japanese Patent Application No. 2012-137973, filed with the Japan Patent Office on Jun. 19, 2012, the entire contents of which are incorporated herein by reference.

The invention claimed is:

1. A linear actuator that expands and contracts in an axial direction, comprising:
   a first tube;
   a second tube inserted into the first tube to be free to slide;
   a rod fixed at one end of the rod to an end portion of the first tube;
   a rod guide provided on the other end of the rod so as to slide relative to the second tube;
   a plurality of permanent magnets held by the rod so as to be arranged in the axial direction;
   a holder that is fitted into the second tube and holds a plurality of coils that oppose the permanent magnets;
   a first chamber defined between one end of the holder and the end portion of the first tube; and
   a second chamber defined between the other end of the holder and the rod guide,
   wherein an insertion hole which connects the first chamber to the second chamber and through which the rod passes is formed in the holder, and
   a connecting groove that connects the first chamber to the second chamber is formed in the second tube to extend in the axial direction.

2. The linear actuator as defined in claim 1, wherein the connecting groove is provided in an inner peripheral surface of the second tube, and a cross-section thereof in an orthogonal direction to the axial direction is formed in an arc shape.

3. The linear actuator as defined in claim 2, wherein the second tube includes an inner tube inserted into the first tube, and a base portion to which the inner tube is attached,
   an inner diameter of the base portion is formed to be larger than an inner diameter of the inner tube,
   the holder includes a small diameter portion fitted to the inner tube and a large diameter portion fitted to the base portion,
   the large diameter portion includes a through hole penetrating in the axial direction, and
   the connecting groove is formed in the inner peripheral surface of the inner tube so as to connect the first chamber to the second chamber via the through hole.

4. The linear actuator as defined in claim 2, wherein the plurality of permanent magnets are provided in a hollow portion of the rod so as to be arranged in the axial direction, and
   the plurality of coils are provided in a recessed portion, which is formed in a holder inner peripheral surface constituting the insertion hole, so as to extend in the axial direction.

5. A groove fashioning method for forming the connecting groove in the second tube of the linear actuator as defined in claim 2, comprising:
   an attachment step of setting the second tube on a lathe such that a turning tool is inserted into the second tube; and
   a trimming step of trimming the inner peripheral surface of the second tube by rotating the turning tool in order to form the connecting groove such that the cross-section thereof in the orthogonal direction to the axial direction is arc-shaped.

* * * * *